US007002792B2

(12) United States Patent
Han et al.

(10) Patent No.: US 7,002,792 B2
(45) Date of Patent: Feb. 21, 2006

(54) STRUCTURE FOR MOUNTING FLAT DISPLAY MODULE AND METHOD THEREOF

(75) Inventors: Kwang Kuk Han, Osan-si (KR); Won Sub Oh, Pyeongtaek-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 10/406,234

(22) Filed: Apr. 4, 2003

(65) Prior Publication Data

US 2003/0189681 A1 Oct. 9, 2003

(30) Foreign Application Priority Data

Apr. 4, 2002 (KR) ...................... 10-2002-0018637
Apr. 4, 2002 (KR) ...................... 10-2002-0018638

(51) Int. Cl.
*G06F 1/16* (2006.01)

(52) U.S. Cl. ...................................... 361/681; 345/905

(58) Field of Classification Search ................ 361/679, 361/681, 682; 345/58–62, 905; 248/917–919
See application file for complete search history.

(56) References Cited

U.S. PATENT DOCUMENTS

| | | | | |
|---|---|---|---|---|
| 5,926,237 | A | 7/1999 | Yun et al. | |
| 6,144,423 | A | 11/2000 | Kim | |
| 6,144,552 | A * | 11/2000 | Whitcher et al. | 361/681 |
| 6,498,631 | B1 * | 12/2002 | Natsuyama | 349/62 |
| 6,501,641 | B1 * | 12/2002 | Kim et al. | 361/681 |
| 6,587,166 | B1 * | 7/2003 | Lee et al. | 349/58 |
| 2004/0196413 | A1 * | 10/2004 | Satonaka | 349/58 |

FOREIGN PATENT DOCUMENTS

JP 2001-033761 2/2001

* cited by examiner

*Primary Examiner*—Lisa Lea-Edmonds
(74) *Attorney, Agent, or Firm*—Birch, Stewart, Kolasch & Birch, LLP

(57) ABSTRACT

A structure for mounting a flat display module is described that includes a supporting member fixed on at least one edge portion of the flat display module and having a position guiding tab projecting to the exterior of the flat display module from one side. The structure includes a rear cover having a fitting groove in its edge portion corresponding to the position guiding tab for receiving the position guiding tab in order to provide a convenient and reliable method and structure for assembling a flat display module within a notebook computer.

11 Claims, 8 Drawing Sheets

A-A'

STRUCTURE FOR MOUNTING FLAT DISPLAY MODULE AND METHOD THEREOF

CROSS-REFERENCES TO RELATED APPLICATIONS

This nonprovisional application claims priority under 35 U.S.C. §119(a) on Patent Applications Nos. 2002-18637 filed in Korea on Apr. 4, 2002, and 2002-18638 filed in Korea on Apr. 4, 2002, the entirety of each of which are herein incorporated by reference.

BACKGROUND OF THE INVENTION

1. Field of the Invention

The present invention relates to a structure and method for mounting a flat display module, and more particularly to a structure and method for mounting a flat display module capable of conveniently and firmly mounting a liquid crystal display (LCD) module for use in a computer, e.g., a notebook computer. The present invention is capable of increasing process efficiency and reducing manufacturing costs by simplifying the production process of a notebook computer.

2. Background of the Related Art

A notebook computer is typically small in volume, lightweight and operates using a battery, so that a notebook computer is a convenient apparatus that can be used without significant restrictions in space. A notebook computer of the background art includes a base portion on which elements such as a keyboard and a central processing unit are mounted. A display part is joined, e.g., in a hinged-manner, to the base portion and on which a flat display module, e.g., such as a LCD module, is mounted.

Particularly, the background art includes various structure and method for mounting a flat display module used in the display part, including the arrangements described by U.S. Pat. No. 5,926,237, entitled "Computer having liquid crystal display," and the U.S. Pat. No. 6,144,423 entitled "Method of mounting liquid display module and apparatus thereof," the entirety of which are hereby incorporated by reference.

The above references cited as the background art will be described in greater detail hereinafter. The background art includes a predetermined extension part additionally formed in the horizontal direction from the outer periphery, particularly the lateral sides of the LCD module. A boss is also formed on the inner lateral sides of the extension part and the rear cover or the front cover. A joining member such as a screw is inserted through the extension part and the boss in the applications of the background art.

However, the present inventors have determined that the background art suffers from the following advantages and disadvantages. The apparatus and method suggested by the above-identified references have adopted an approach employing a predetermined extension part vertically extended from the outer periphery of the LCD display module, and a screw inserted into the lateral sides of the extension part and the rear cover or the front cover. This method is often referred to as a side mounting method. The screw also improves convenience in the assembling process by being additionally joined to the hinge structure for joining the display part and the base portion. According to such a method, the occupying ratio of the flat display module in the whole display part is increased, e.g., the effective display area is further increased and convenience in usage is improved.

However, the screw(s) is/are exposed to the outside since these screws are inserted into the lateral side of the teat cover in the above-identified examples, thereby demonstrating a poor exterior appearance. Further, the LCD module, the front module, and the rear cover are joined by a common screw hole, and the boss must therefore be exactly aligned to ensure a relatively difficult and cumbersome assembling process is completed properly. Accordingly, manufacturing costs are increased for a computer such as a notebook computer having the above-identified structure of the background art.

SUMMARY OF THE INVENTION

The present invention overcomes the shortcomings associated with the background art and achieves other advantages not realized by the background art.

An object of the present invention is to provide a structure and method for conveniently mounting a flat display module while securing a smooth and clear appearance of the display part.

An object of the present invention is to provide a structure for mounting a flat display module capable of further promoting the convenience of the personnel assembling the display part on which a flat display module is mounted through a more convenient procedure.

It is still another object of the present invention to provide a structure and method for mounting a flat display module capable of reducing manufacturing costs for a notebook computer.

One of more these objects is accomplished by a structure for mounting a flat display module comprising a base portion being formed in a lower side of the structure; a display part being formed on an upper side of the base portion, the display part including at least a flat display module mounted therein; a supporting member being secured on at least one of a plurality of edge portions of the flat display module, the supporting member having a position guiding tab projecting toward an exterior of the flat display module from a first end of the position guiding tab; and a rear cover having a guiding block with a fitting groove along an edge portion corresponding to the position guiding tab for receiving the position guiding tab.

One of more these objects is accomplished by a structure for mounting a flat display module comprising a base portion being formed in a lower side of the structure; a display part being formed on an upper side of the base portion, the display part including at least a flat display module mounted therein; a rear cover having a hook receiving member at an edge portion of an inner lateral side of the rear cover; and a front cover being formed on an upper side of the flat display module, the front cover having a hook corresponding to the hook receiving member and engaging with the hook receiving member to secure the front cover to the rear cover.

One of more these objects is accomplished by a housing for mounting a flat display module in a notebook computer comprising a base portion being formed in a lower side of the housing; a display having an LCD display module being formed on an upper side of the base portion and a backlight panel; a front cover and a rear cover, wherein the LCD display module is between the front cover and the rear cover and the backlight panel is interposed between the rear cover and a rear side of the LCD display module; and means for securing the LCD display module within the front cover and the rear cover, wherein the means for securing the LCD display module includes at least one of a supporting member having a fitting groove and being engaged with a position guiding tab, and a hook and a hook receiving member, wherein the LCD display module is secured to the front cover and the rear cover by the means for securing without any fasteners being exposed on any exterior surface of the display.

One of more these objects is accomplished by a method for mounting a flat display module to a computer display comprising the steps of mounting a supporting member having a position guiding tab projecting toward an exterior of the flat display module on at least one corner of the flat display module, wherein the flat display module includes an LCD module; aligning the position guiding tab with at least one guide block formed on a rear cover of the computer display; mounting the supporting member to the rear cover of the computer display, wherein the rear cover includes the at least one guiding block matingly engaging with the position guiding tab and a module joining boss formed on the rear cover and aligning with a joining hole on the supporting member, and mounting a front cover to the rear cover, wherein the LCD module is positioned therebetween.

One of more these objects is accomplished by a method for mounting a flat display module to a computer display comprising the steps of mounting a front cover on a upper side of the flat display module, wherein the front cover includes at least one hook formed on an inner periphery of the front cover and inserted into at least one hook-receiving member formed on an inner periphery of a rear cover; and mounting a the flat display module between the rear cover and the front cover, the flat display module including an LCD module being aligned by the hook-receiving members, wherein lateral edges of the LCD module are positioned in contact with the hook-receiving members of the rear cover.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF PREFERRED EMBODIMENTS

Figure 1:
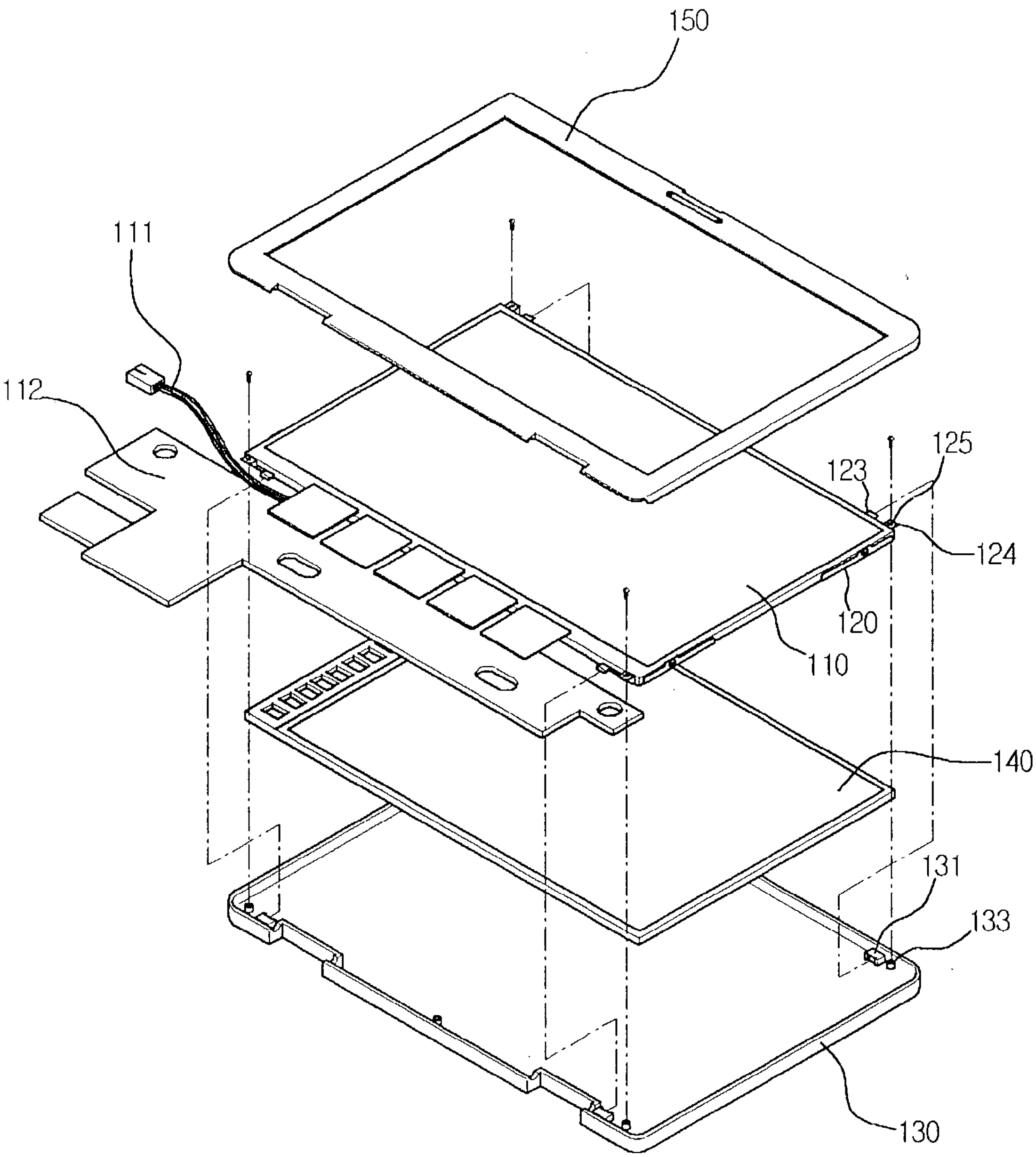
FIG. 1 is a perspective view of a structure for mounting a flat display module according to a first embodiment of the present invention.

The present invention will hereinafter be described with reference to the accompanying drawings. In the following description, the same drawing reference numerals are used for the same elements even in different drawings.

First Embodiment

Figure 2:
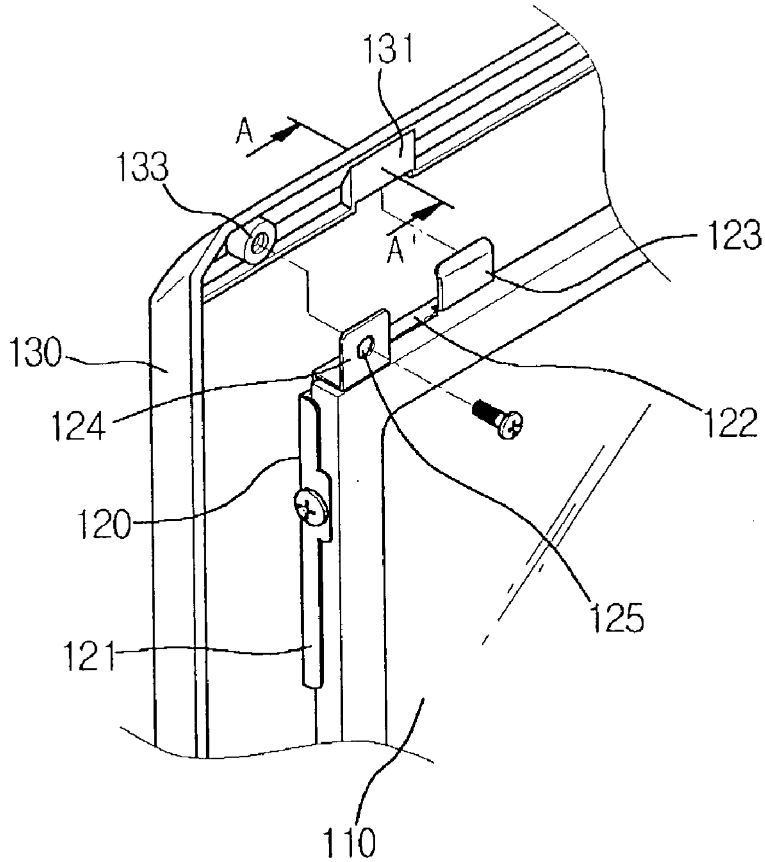
FIG. 2 is a partial, exploded perspective view detailing the construction and operation of the supporting member according to the first embodiment of the present invention.
Figure 3:
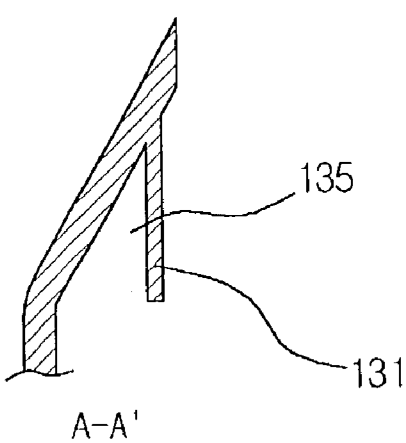
FIG. 3 is a cross-sectional view of a guiding block according to the first embodiment of the present invention.
Figure 4:
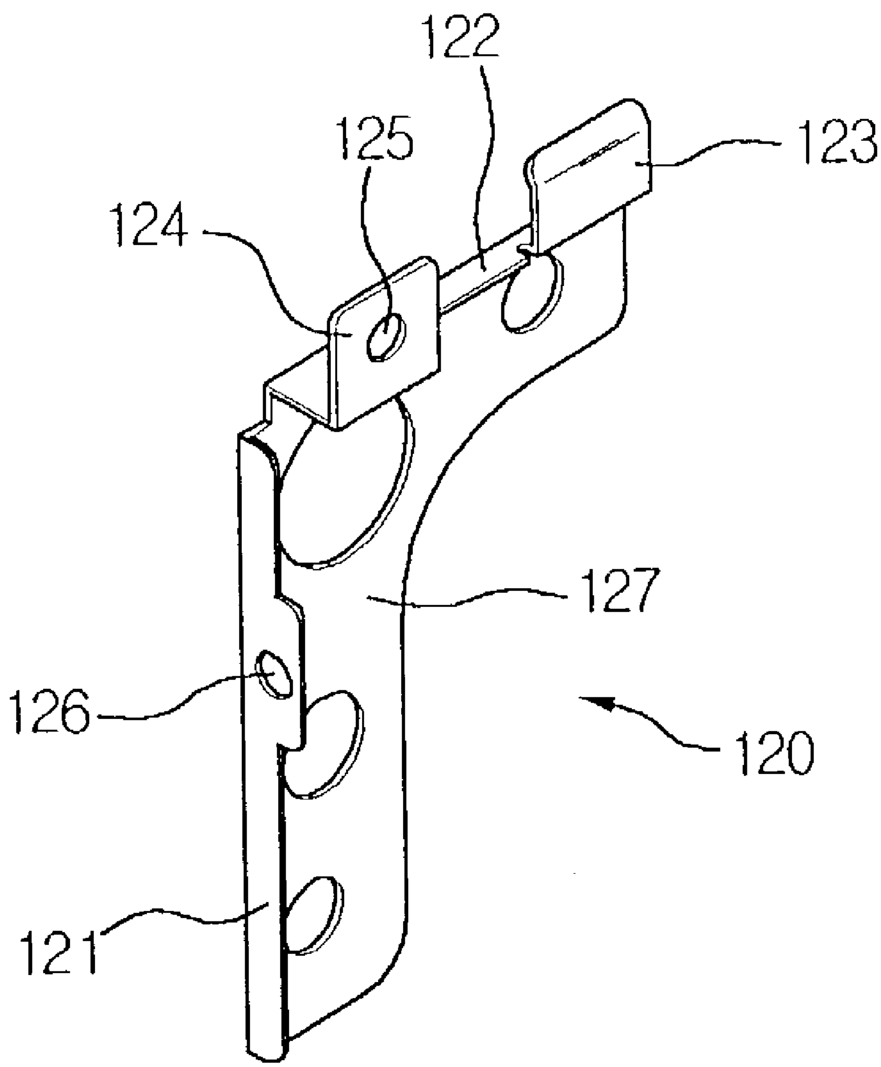
FIG. 4 is a perspective view of the supporting member according to the first embodiment of the present invention.

FIG. 1 is a perspective view of a structure for mounting a flat display module according to a first embodiment of the present invention. FIG. 2 is a partial, exploded perspective view detailing the construction and operation of the supporting member according to the first embodiment of the present invention. FIG. 3 is a cross-sectional view of a guiding block according to the first embodiment of the present invention. FIG. 4 is a perspective view of the supporting member according to the first embodiment of the present invention.

FIG. 1 is a perspective view of a structure for mounting the flat display module according to the first embodiment of the present invention, and FIG. 4 is a perspective view of the supporting member. The structure for mounting the flat display module according to the present invention includes a rear cover 130 for protecting the rear side of the display portion of the display module, a front cover 150 for protecting the front side of the display part; an LCD module 110 fixedly mounted between the rear cover 130 and the front cover 150, and a backlight panel 140 additionally mounted on the rear side of the LCD module 110 for illuminating lights. The LCD module 110 includes a supporting member 120 formed on four edge portions of the LCD module for fixing the LCD module 110 within the rear cover 130.

More specifically, referring to FIG. 4, the supporting member 120 includes a joining part 124 having a joining hole 125 into which a joining member, e.g., a screw, is inserted. A position guiding tab 123 for stably guiding the position of the LCD module 110. Also, the supporting member 120 may be formed, in pairs, on either the front side or the rear side of the LCD module 110, and/or may be formed on both sides of the LCD module 110.

The front cover 150 is secured by a side mounting structure or a hook to the LCD display module 110. A wiring 111 for receiving a display signal and a substrate 112 on which a plurality of circuit parts is mounted are additionally provided on the LCD module 110. A boss 133 arranged and positioned in alignment with the corresponding joining hole 125, and a guiding block 131 positioned corresponding to the position guiding tab 123 are mounted on the rear cover 130.

Referring to FIG. 2 and FIG. 4, the supporting member 120 includes a supporting part 127 plane-contacted with the rear side of the LCD module 110 for stably supporting the module 110. A horizontal guide portion 121 vertically bent from the lateral side of the supporting part 127 for guiding the horizontal positioning of the supporting member 120, a vertical guide portion 122 vertically bent from the upper side of the supporting part 127 for guiding the vertical positioning of the supporting member 120, and a joining hole 126 formed on the horizontal guide portion 121 for fixing the supporting member 120 in the LCD module 110 are provided. A joining part 124 bent upward from an end of the vertical guide portion 122, and having a joining hole 125 for fixing the supporting member 120 in the rear cover 130, and a position guiding tab 123 bent upward from the end of the vertical guide portion 122 for guiding the position where the supporting member 120 is put on the rear cover 130 are also provided.

The upper end of the position guiding tab 123 is bent at a predetermined angle, so that the process of positioning the position guiding tab 123 within the guiding block 131 can be performed more conveniently. FIG. 3 is a cross-sectional view of the guiding block. In FIG. 3, the guiding block 131 is formed on the inner edge of a case constituting the outer periphery of the rear cover 130. A predetermined fitting groove 135 is formed in the inside of the guiding block 131, for receiving the position guiding tab 123.

As seen in FIG. 2, the supporting member 120 is preferably formed on the four corner sections of the LCD module 110. The guiding block 131 having a groove in its interior is formed on the edges of the rear cover 130 corresponding to the position guiding tab(s) 123. Also, a module joining boss 133 is formed on the edges of the rear cover 130 corresponding to the joining part(s) 124.

A method for mounting the foregoing LCD module will be sequentially described hereinafter. The supporting member 120 is put on the four corner sections of the LCD module 110. Next, the horizontal guide portion 121 of the supporting member 120 is put on the lateral side of the LCD module 110, and the joining hole 126 formed on the horizontal guide portion 121 is joined to a side hole(not shown) of the LCD module 110 by inserting a screw, whereby the supporting member 120 is fixed to the LCD module 110.

After being integrally joined to the LCD module 110, the supporting member 120 is then mounted on the rear cover 130. The position guiding tab 123 is fit within the guiding block 131. The upper end of the position guiding tab 123 can be conveniently fit in the guiding block 131 since it is bent obliquely. In case that the position guiding tabs 123 are mounted on the four corners in the upper and lower sides of the LCD module 110, the position guiding tab 123 on one side is inserted first, and then the position guiding tab 123 on the other side is subsequently inserted.

After the position guiding tab 123 is inserted into the guiding block 131 so that the position of the LCD module 110 is approximately determined, the joining part 124 formed on the supporting member 120 is joined to the module joining boss 133 formed on the rear cover 130 by inserting screws, whereby the LCD module 110 is firmly secured to the rear cover 130.

After the LCD module 110 is fixed in the rear cover 130 in this manner, the front panel 150 is fixed, so that assembling process for the display part is completed. A joining method using a hook or side mounting method of the related art could be also used for affixing the front panel 150. The mounting position of the LCD module 110 can be simplified by the foregoing process where the position guiding tab 123 is inserted into the guiding block 131. Therefore, the mounting process of the LCD module 110 is performed in a more simple and convenient manner. Also, the LCD module can be joined without any exposed screws on the exterior, so that a neat appearance is achieved and manufacturing costs are reduced.

Second Embodiment

Figure 5:
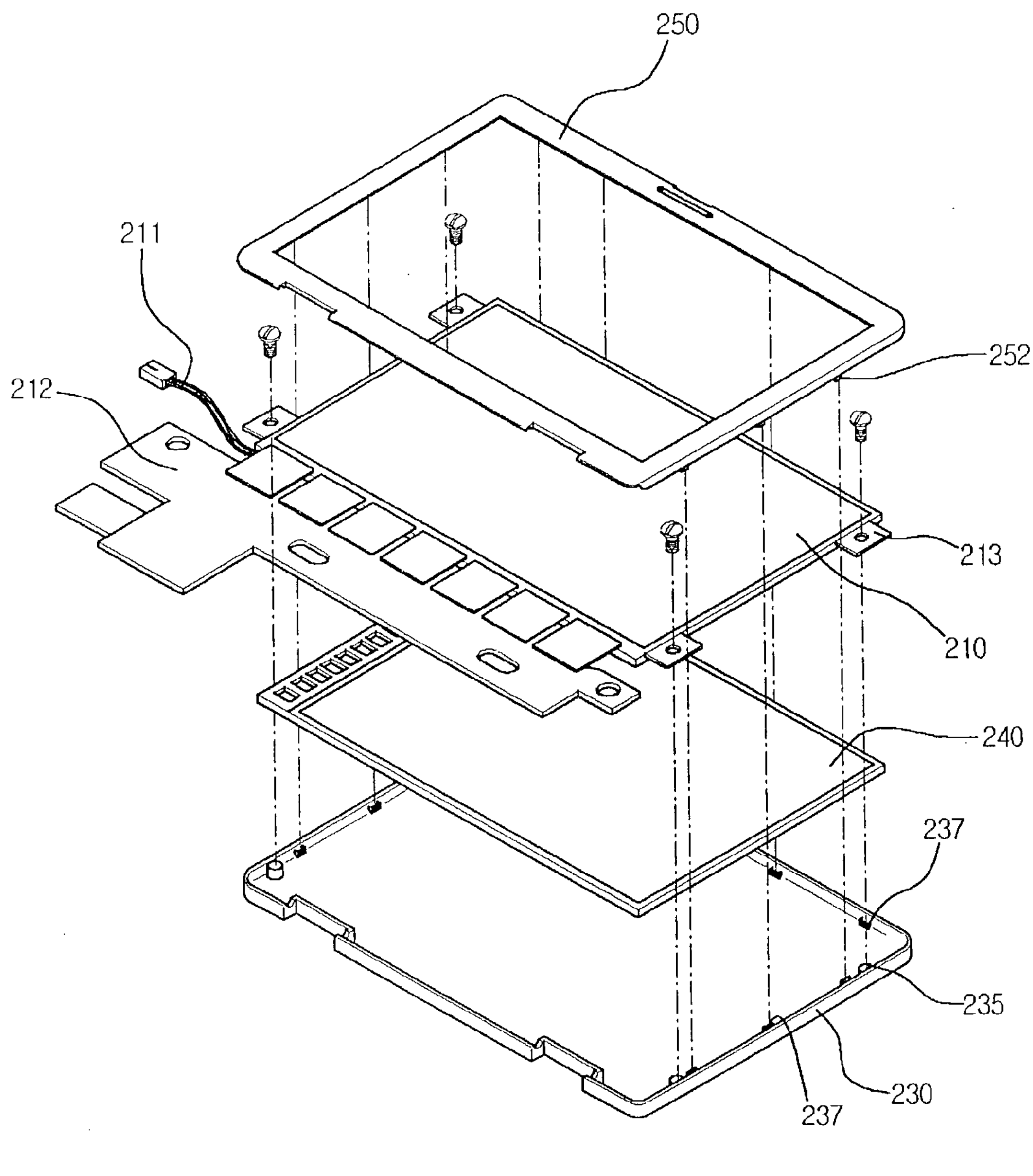
FIG. 5 is a perspective view of a structure for mounting a flat display module according to a second embodiment of the present invention.
Figure 6:
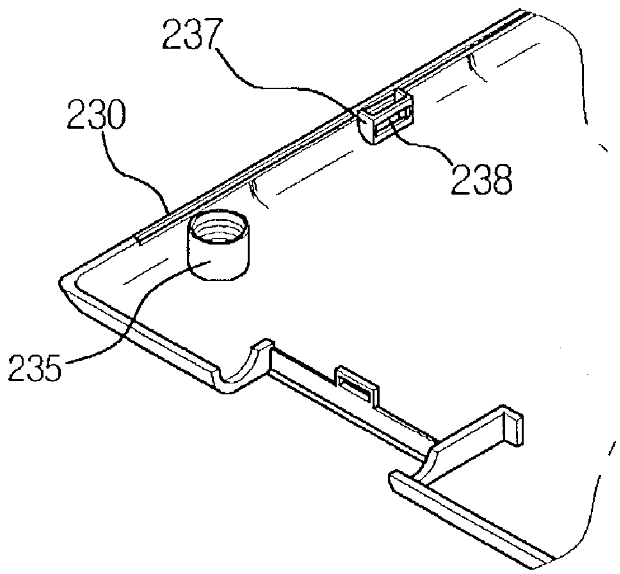
FIG. 6 is a partial, perspective view of a hook-receiving member according to the second embodiment of the present invention.
Figure 7:
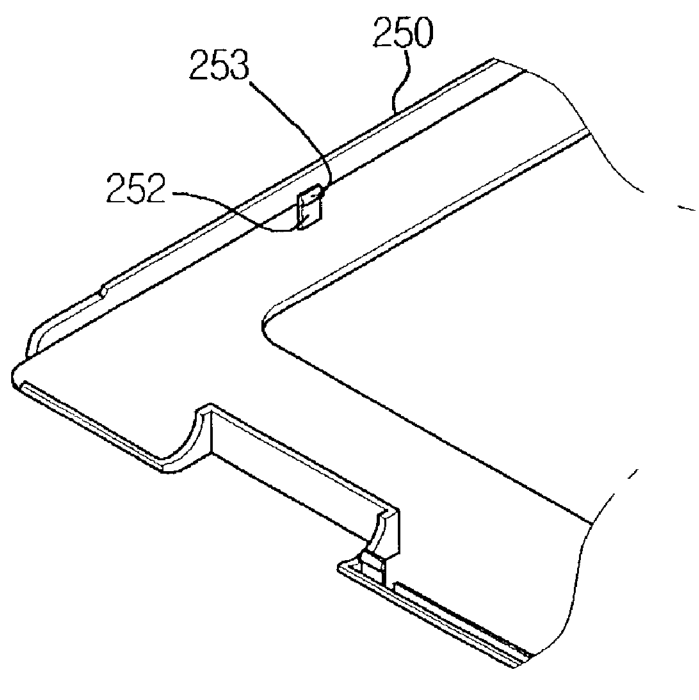
FIG. 7 is a partial, perspective view of a hook member according to the second embodiment of the present invention.

FIG. 5 is a perspective view of a structure for mounting a flat display module according to a second embodiment of the present invention. FIG. 6 is a partial, perspective view of a hook-receiving member according to the second embodiment of the present invention. FIG. 7 is a partial, perspective view of a hook member according to the second embodiment of the present invention.

The second embodiment of the present invention is similar to the first embodiment in that the present embodiment includes a rear cover 230, a backlight panel 240, an LCD module 210, and a front cover 250. However, the supporting member and the related construction that have been suggested by the first embodiment (refer to FIG. 4) are not included.

Instead, an alternative structure for mounting the LCD module 210 conveniently and determining the positions of the front cover 250 and the rear cover 230 in a simple and exact manner is provided in the second embodiment. FIG. 5 is a perspective view of the second embodiment of the present invention. In FIG. 5, the rear cover 230, the backlight panel 240, the LCD module 210, and the front cover 250 are provided. Also, more than one hook-receiving member 237 formed on the four edges along the inner periphery of the rear cover 230, and a hook 252 formed on the rear side of the four outer edges of the front cover 250 for being inserted into and hooked into the hook-receiving member 237 are additionally provided.

As seen in FIG. 6, the hook-receiving member 237 is formed in the inside of the edges of the four sides of the rear cover 230, and the upper side of the receiving member 237 is opened, e.g., with an opened end, for receiving the corresponding hook 252. Also, a hooking part 238 is formed for preventing the hook 252 from being detached from the opening in the front side of the hook-receiving member 237. As seen in FIG. 7, more than one hook 252 is formed on the four edges along the inner lateral side of the front cover 250, and the upper end of the hook 252 has a protuberance 253 bending inward, e.g., toward the center of the front cover 250.

An operation where the hook 252 is inserted will be described in greater detail hereinafter with reference to FIG. 6 and FIG. 7. First, the hook 252 is inserted through the upper side of the hook-receiving member 237. Then, the protuberance 253 of the upper end of the hook 252 is inserted into the hooking part 238 and hooked accordingly. Since the hook 252 is hooked at the hooking part 238, the protuberance 253 formed on the hook 252 is not detached from the hooking part 238 as long as a predetermined force is not exceeded so that the hook 252 is firmly secured.

The hook 252 and the hook-receiving member 237 are formed, respectively, on corresponding positions of the front cover 250 and the rear cover 230. Also, it is preferable that at least one pair of the hook 252 and the hook-receiving member 237 is provided to each edge of the front cover 250 and the rear cover 230 so that all sides may be secured in a secure and stable manner. However, the pairs of hooks 252 and corresponding hook-receiving members 237 are not always necessarily provided on all sides, e.g., the number of pairs of hooks 252 and hook-receiving members 237 can be varied.

The hook-receiving member 237 receives the hook 252 for guiding the position of the LCD module 210 as well as affixing the front cover 250. More specifically, the hook-receiving member 237 is formed above a predetermined height so the four edges of the LCD module 210 come into precise contact with the hook-receiving member 237 and the mounting position of the LCD module 210 can be properly aligned. As described above, even though the position of the LCD module 210 attached on the rear cover 230 is not affixed by means of a fastening member such as a screw, the positioning can be aligned and determined by the hook-receiving member 237 so that fastening process is simplified.

The position of the LCD module 210 is guided and the position of the front cover 250 is firmly fixed by the hook-receiving members 237. Therefore, in order to provide sufficient strength for performing these operations, an appropriate number of the hook 252 and the hook-receiving members 237 are formed on the front cover 250 and the rear cover 230, respectively. Alternatively, the hooks 252 may be formed on the rear cover 230 and the hook-receiving members 237 may be formed on the front cover 250, without any appreciable loss in effect.

If the position of the LCD module 210 is not exactly guided by the hook-receiving member 237, a fixing part 213 formed on the lateral outer periphery of the LCD module 210 and having a predetermined hole on it, and a module joining boss 235 corresponding to the fixing part 213, can be additionally and optionally provided.

The operation of the fixing part 213 and the module joining boss 235 is described in greater detail hereinafter. First, the LCD module 210 is conveniently guided by the hook-receiving member 237 and placed on the rear cover 230. Also, a screw is inserted into the fixing part 213 and the module joining boss 235, so that the LCD module is more safely fixed.

A method for mounting the LCD module according to the second embodiment having the foregoing construction will be described hereinafter. The backlight panel 240 and the LCD module 210 are mounted on the inside of the rear cover 230 having the hook-receiving members 237 on its four edges. During this process, the mounting position of the LCD module 210 is guided by the hook-receiving member 237, so that the LCD module 210 is mounted more conveniently.

After the LCD module 210 is mounted, the front cover 250 having the hook 252 is mounted on the front side of the rear cover 230. The hook 252 is hooked at the hook-receiving member 237, so that the position of the front cover 250 is precisely determined. Also, the front cover 250 and the rear cover 230 are firmly engaged with each other. The protuberance 253 formed on the end of the hook 252 is inserted into and fixed within the hooking part 238, so that the hook 252 and the hook-receiving member 237 are firmly engaged.

After the positions of the front cover 250 and the rear cover 230 ate determined and affixed, a screw is inserted and to more firmly secure the front 250 and the rear covers 230. The whole joining process for the display part is completed through the foregoing processes.

The module joining part 213 and the module joining boss 235 occasionally may be provided on the outer periphery of the LCD module 210. In that case, after the mounting position of the LCD module 210 is determined by the hook-receiving member 237, a screw is inserted into the module fixing part 213 and the module joining boss 235, so that the LCD module 210 can be more firmly secured. According to the present embodiment, fixing of the front cover 250 and the rear cover 230 can be performed more conveniently.

According to the present embodiment, the front cover 250 and the rear cover 230 are joined in an easy and precise manner, and the process for mounting the LCD module 210 on the rear cover 230 can be quickly and easily performed. The efforts of assembly are reduced and the production of the notebook computer is improved.

Third Embodiment

Figure 8:
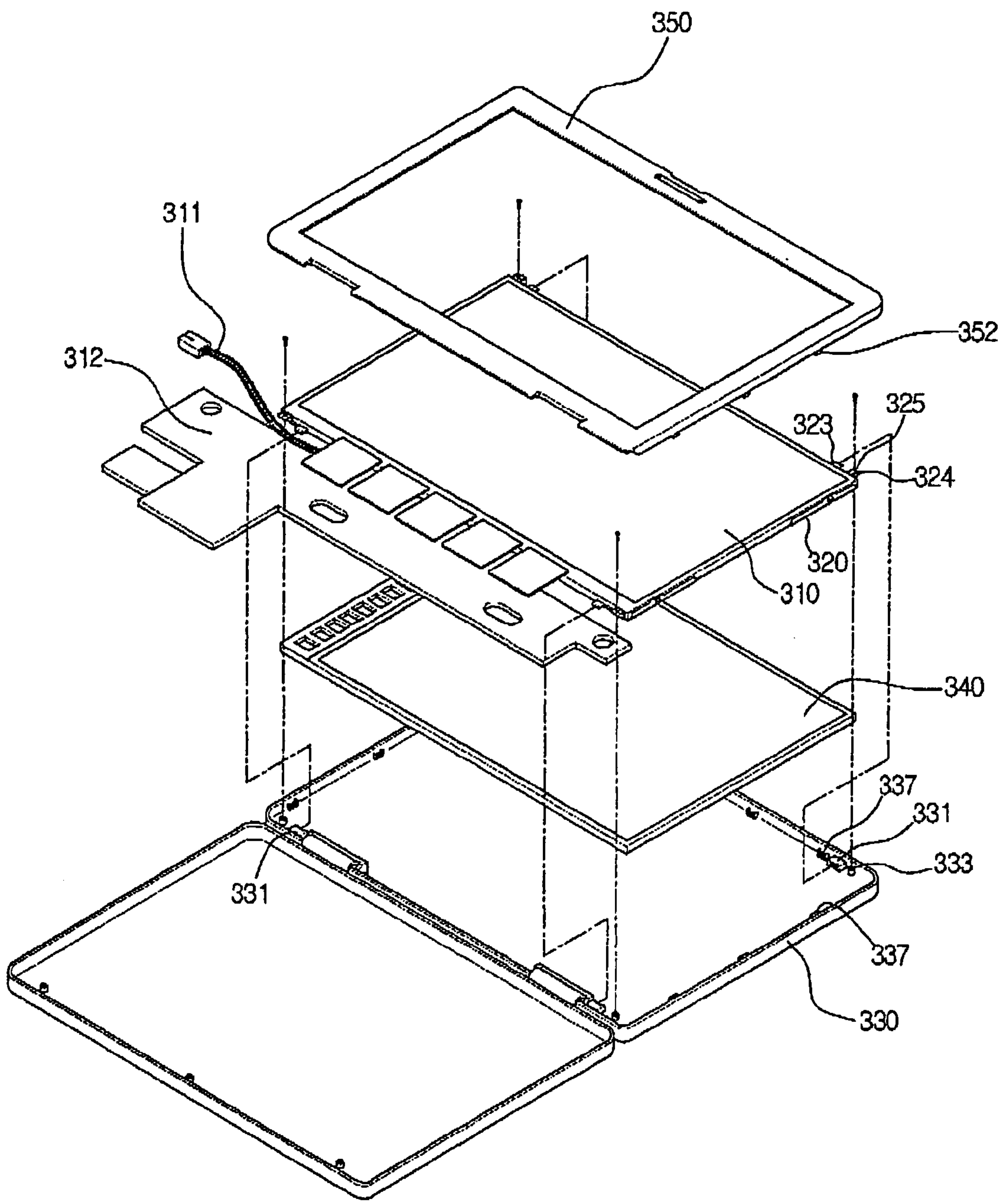
FIG. 8 is a perspective view of a structure for mounting a flat display module according to a third embodiment of the present invention.

FIG. 8 is a perspective view of a structure for mounting a flat display module according to a third embodiment of the present invention. The third embodiment of the present invention is the same as the first and the second embodiments, and only differs in that constructions included in the first and the second embodiments are realized in a composite manner.

Accordingly, the construction relating to a rear cover 330, a front cover 350, a LCD module 310, a backlight panel 340, a supporting member 320, a joining hole 325, a joining part 324, a position guiding tab 323, a wiring 311, a substrate 312, a boss 333, a guiding block 331, a hook-receiving member 337, and a hook 351, is the same as the construction of the first and the second embodiments, and different in that these elements ate included in a combined embodiment.

As construction and operation suggested by the third embodiment is almost the same as the constructions by the first and the second embodiments, the detailed descriptions thereof will be omitted. However, as the construction of the hook 351 and the hook-receiving member 322, and the construction of the supporting member 320 are applied at the same time, it is not necessary that the supporting member 320 be provided over all the edges of the LCD module 310. Since appropriate strength of the design can be secured, the supporting member 320 may not be required over all of the positions of described with respect to the supporting member 120 of the first embodiment of the LCD module.

Fourth Embodiment

Figure 9:
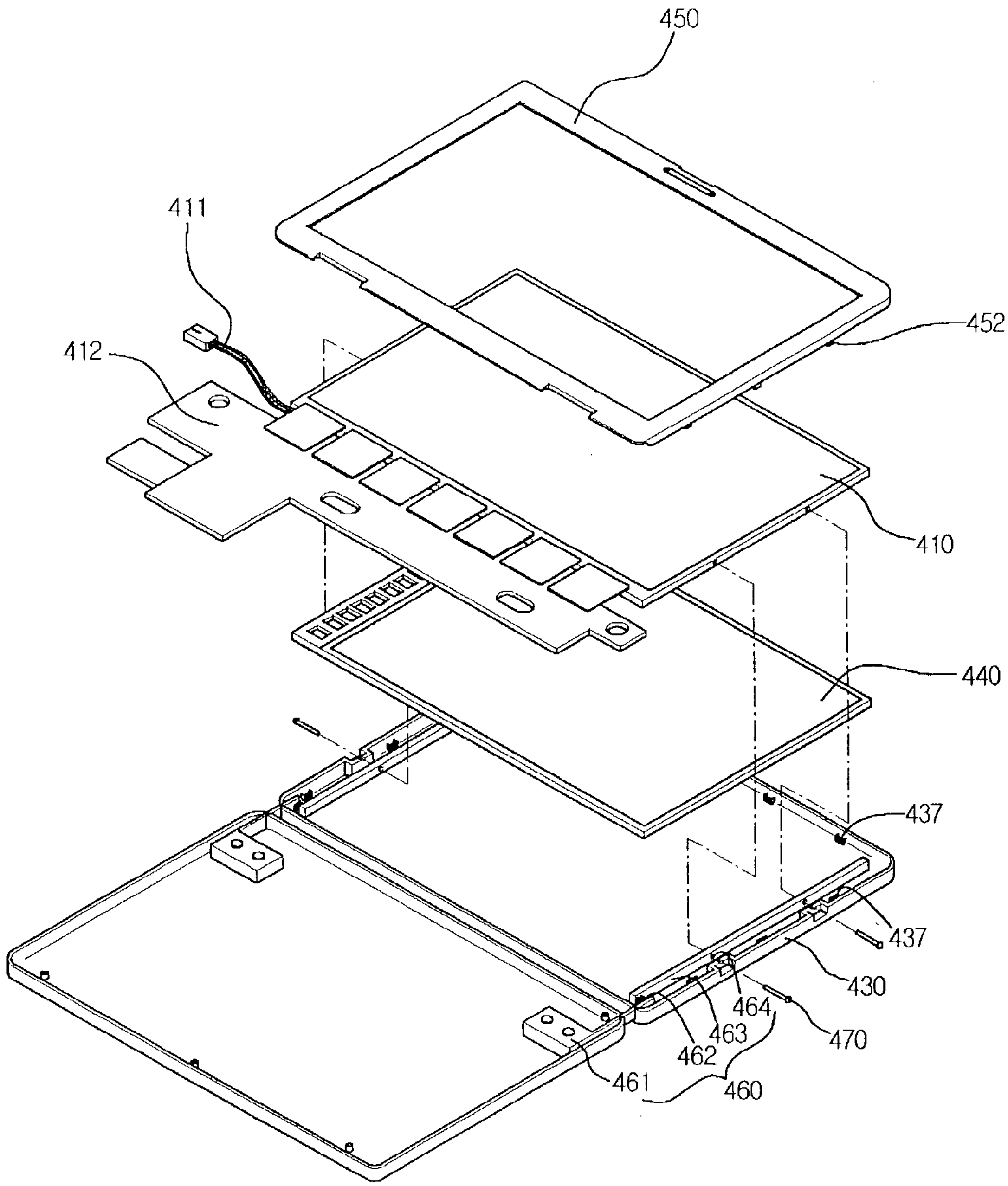
FIG. 9 is a perspective view of a structure for mounting a flat display module according to a fourth embodiment of the present invention.

FIG. 9 is a perspective view of a structure for mounting a flat display module according to a fourth embodiment of the present invention. Referring to FIG. 9, the fourth embodiment is almost the same as the second embodiment in its construction of a rear cover 430, a front cover 450, a LCD module 410, a backlight panel 440, a wiring 411, a substrate 412, a hook-receiving member 437, and a hook 452.

However, the present embodiment differs from the second embodiment in that the side mounting method where a screw is fastened at the side of the LCD module 410, and/or the side of a hinge 460 and/or the rear cover 430 is adopted. Therefore, a hinge part 460 formed between the base portion, e.g., the base portion of the notebook computer, and the display part is additionally provided.

The hinge part 460 includes an base portion attachment piece 461 fixed on the base portion, a rotational arm 463 mounted on the display part, a hinge shaft 462 formed as a rotational central shaft between the rotational arm 463 and the base portion attachment piece 461, and more than one inserting hole 464 formed on the rotational arm 463 for receiving a joining member exemplified as a screw 470.

Operation of the LCD module having the foregoing construction will be described in greater detail hereinafter. Firstly, as the hook-receiving member 437 and the hook 452 are nearly the same as those of the second embodiment, a detailed description of these elements will be omitted hereinafter.

However, the hinge part 460 will be described in greater detail hereinafter. The base portion attachment piece 461 of the hinge part 460 is firmly fixed on the inner lateral side of the base portion by a predetermined joining method such as bonding, hooking, or joining with a screw. The rotational arm 463 can also be fixed on the lateral side of the rear cover 430 in the same manner as the base portion attachment piece 461. However, the side mounting method together with or instead of this method may be applied, so that the rotational arm 463 may be joined simultaneously by means of a screw for joining the sides of the LCD module 410 and the rear cover 430.

As described above, one characteristics of the present embodiment is that the side of the LCD module 410 is firmly and simultaneously joined to the rotational arm 463 and/or the rear cover 430 by a screw 470. Also, another characteristic of the present invention is that the LCD module 410 is aligned by means of the hook-receiving member 437 and the hook 452, and convenient mounting effect for the front cover 450 can be accomplished.

A method for mounting the LCD module according to the present invention will be described in the following. Firstly, the hinge part 460 is arranged between the base portion and the display part. The base portion attachment piece 461 is firmly fixed on the inner surface of the base portion. The rotational arm 463 may then be fixed on the inner lateral side of the display part. After the hinge part 460 is mounted, the backlight panel 440 and the LCD module 410 are conveniently mounted in the inside of the hook-receiving member 437.

In the background art, there are no hook-receiving members 437 for guiding and mounting the LCD module, and a user is required to take significant steps to align the LCD module. However, according to the present embodiment, since the position of the LCD module 410 is guided by the hook-receiving member 437, the LCD module is mounted in a more convenient and simple manner.

After the LCD module 410 is properly mounted, all the sides contacting the lateral sides of the LCD module 410 are fastened by a screw 470 passing through the lateral sides of the rear cover 430 and/or the rotational arm 463. If the fastening strength of the screw 470 for the rotational arm 463 is less than desired, the rotational arm 463 may be additionally joined to the display part.

After the rotational arm 463, the LCD module 410, and the rear cover 430 are joined by the screw, the front cover 450 is mounted. The hook 452 formed on the front cover 450 is inserted into the hook-receiving member 437, whereby joining of the front cover 450 is completed. However, a screw may be used to more firmly join the front cover if necessary. According to the present embodiment described above, a worker could perform the assembly process for the flat display module in a more convenient manner, and manufacturing costs for the notebook computer are reduced.

Fifth Embodiment

Figure 10:
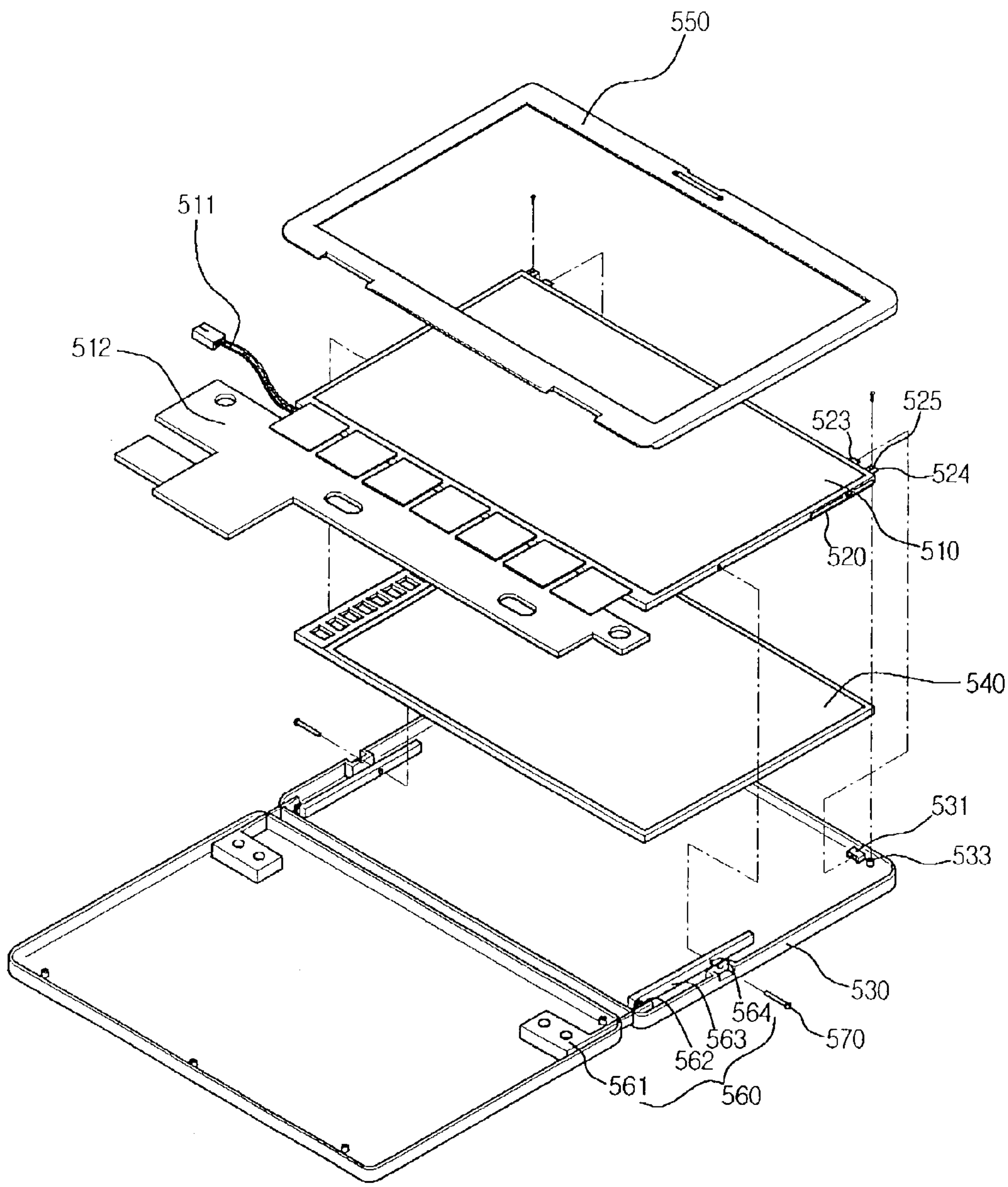
FIG. 10 is a perspective view of a structure for mounting a flat display module according to a fifth embodiment of the present invention.

FIG. 10 is a perspective view of a structure for mounting a flat display module according to a fifth embodiment of the present invention. The fifth embodiment of the present invention is nearly the same as the fourth embodiment. However, the present embodiment does not include the hook 452 and the hook-receiving member 437 suggested by the fourth embodiment. Instead, the same elements as the supporting member(refer to the element 120 in FIG. 1), the module joining boss(refer to the element 133 in FIG. 1) corresponding to the supporting member 120, the guiding block(refer to the element 131 in FIG. 1), and many constructions relating to the above elements are provided.

More specifically, a supporting member 520 has a module joining part 524 and a position guiding tab 523. Also, on the inner lateral side of a rear cover 530, a guiding block 531 and a module joining boss 533 are additionally formed, so that joining process for the LCD module 510 is performed in a more convenient manner.

The method for mounting the LCD module suggested by the present embodiment will be described in greater detail hereinafter. First, the hinge part 560 is arranged between the base portion and the display part. The base portion attachment piece 561 is then firmly fixed, on the inner surface of the base portion. The rotational arm 463 may then be fixed on the inner lateral side of the display part, but may be more simply mounted.

After the hinge part 560 is mounted, the backlight panel 540 and the LCD module 510 are conveniently mounted in the inside of the rear cover 530. The mounting position of the LCD module 510 can be determined more conveniently by the procedure that the position guiding tab 523 is inserted into the guiding block 531.

In the background art, as there is no element such as the supporting member 520 and the guiding block 531 for guiding and mounting the LCD module, a user needs to undertake additional efforts to align the LCD module. However, according to the present embodiment, since the position of the LCD module 510 can be guided by the position guiding tab 523 and the guiding block 531, the convenience of a worker is increased.

After the LCD module 510 is properly mounted, the side contacting the lateral sides of the LCD module 510 is fastened by a screw 570 passing through the lateral sides of the rear cover 530 and/or the rotational arm 563. If the fastening strength of the screw 570 for the rotational arm 563 is less than desired, a step of joining the rotational arm 563 to the display part could be additionally performed. Fastening of the rotational arm 563, and joining of the joining hole 525 and the module joining boss 533 using the screw 570 are performed simultaneously.

More specifically, as seen in FIG. 5, the rotational arm 563 is relatively short compared to the fourth embodiment and the screw is provided at only one portion. However, it is preferable that the length of the rotational arm 563 should be as long as possible without restricting the range of the supporting member 520. Also, the portion to which the rotational arm 563 is joined, is not restricted to one portion, but may be joined at additional portions.

After the rotational arm 563, the LCD module 510, and the rear cover 530 are joined by the screw, the front cover 550 is mounted. The front cover 550 may be secured by a predetermined hook structure or the general method of side mounting. In addition, the hook (refer to the element 452 in FIG. 4), the hook-receiving member (refer to the element 437 in FIG. 4), and the supporting construction could be used for joining the front cover 550. According to the present embodiment described above, a worker can perform the assembly process for the flat display module in a more convenient manner and manufacturing costs for the notebook computer are reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for mounting a flat display module comprising:

a base portion being formed in a lower side of the structure;

a display part being formed on an upper side of the base portion, the display part including at least a flat display module mounted therein;

a rear cover having a hook receiving member at an edge portion of an inner lateral side of the rear cover; and a front cover being formed on an upper side of the flat display module, the front cover having a hook corresponding to the hook receiving member, the hook being inserted into and fixed to the hook receiving member to secure the front cover to the rear cover, thereby abating movement of the front cover with respect to the rear cover in a direction opposite to a direction of inserting the hook into the hook receiving member.

2. The structure according to claim 1, further comprising a hinge member having a rotational arm, said hinge member including a base portion attachment piece affixed to the base portion and said rotational arm being joined to at least one of the lateral side of the rear cover and the flat display module.

3. The structure according to claim 1, wherein the hook receiving members are formed on all of the edges on the inner lateral sides of the rear cover or the front cover.

4. The structure according to claim 1, wherein the hooks are formed on all of the edges on the inner lateral sides of the rear cover or the front cover.

5. The structure according to claim 1, further comprising:

a protuberance formed on an end of the hook; and a hooking portion opening at a front side of the hook receiving member for receiving and securing the protuberance of the hook.

6. The structure according to claim 5, further comprising a backlight panel interposed between said rear cover and said display part, wherein said display part is an LCD display module.

7. The structure according to claim 5, further comprising:

a hook receiving opening at an upper side of the hook receiving member, the hook being inserted into the hook receiving opening.

8. The structure according to claim 1, further comprising:

a supporting member being secured on at least one of a plurality of edge portions of the flat display module, the supporting member having a position guiding tab projecting toward an exterior of the flat display module from a first end of the position guiding tab; and a guiding block with a fitting groove along the edge portion of the inner lateral side of the rear cover corresponding to the position guiding tab for receiving the position guiding tab.

9. The structure according to claim 8, wherein a first end of the position guiding tab is bent to form a locking portion for engaging an interior of the fitting groove.

10. The structure according to claim 8, wherein the position guiding tab is formed extending toward the upper side of the flat display module.

11. A method for mounting a flat display module to a computer display comprising the steps of:

mounting a front cover on an upper side of the flat display module, wherein said front cover includes at least one hook formed on an inner periphery of said front cover and inserted into at least one hook-receiving member formed on an inner periphery of a rear cover; and mounting said flat display module between said rear cover and said front cover and fixing said front cover to said rear cover by inserting said at least one hook into said at least one hook-receiving member, thereby abating movement of said front cover with respect to said rear cover in a direction opposite to a direction of inserting said at least one hook into said at least one hook receiving member, said flat display module including an LCD module being aligned by said hook-receiving members, wherein lateral edges of said LCD module are positioned in contact with said hook-receiving members of said rear cover.

* * * * *